United States Patent [19]
Nakagawa et al.

[11] Patent Number: 5,318,789
[45] Date of Patent: Jun. 7, 1994

[54] SELECTIVE FRUIT FUMIGATION METHODS

[75] Inventors: Glenn T. Nakagawa, Dinuba, Calif.; John W. Rockom, Seattle, Wash.

[73] Assignee: Allpak Container, Inc., Renton, Wash.

[21] Appl. No.: 883,099

[22] Filed: May 15, 1992

[51] Int. Cl.$^5$ .................. A23B 7/144; B65B 31/00
[52] U.S. Cl. ............................ 426/316; 99/467; 99/475; 422/28; 422/40; 422/292; 426/318; 426/320; 426/395; 426/419
[58] Field of Search .............. 426/316, 318, 320, 312, 426/419, 319; 422/37, 32, 28, 29, 30, 40; 229/120, DIG. 14, 916, 23 BT, 23 R; 99/467, 474, 475, 476

[56] References Cited

U.S. PATENT DOCUMENTS

| | | | |
|---|---|---|---|
| 1,668,496 | 5/1928 | Eustis | 426/319 |
| 1,806,012 | 5/1931 | Collins | 426/319 |
| 2,290,473 | 7/1942 | Kalmar | 426/318 |
| 2,358,943 | 9/1944 | Smith | 229/120 |
| 2,540,595 | 2/1951 | Props | 229/120 |
| 2,973,127 | 2/1961 | Royce | 229/120 |
| 3,572,577 | 3/1971 | Dorfman | 229/120 |
| 3,660,116 | 5/1972 | Clark | 229/120 |
| 3,863,829 | 2/1975 | Merrill | 229/120 |
| 4,105,152 | 8/1978 | Elward | 229/23 BT |
| 4,184,625 | 1/1980 | Stollberg et al. | 229/23 BT |
| 4,331,235 | 5/1982 | Brundage | 229/120 |
| 4,946,093 | 8/1990 | Moorman | 229/23 BT |

FOREIGN PATENT DOCUMENTS 2043598 10/1980 United Kingdom ............ 229/120

OTHER PUBLICATIONS

Wiley Encyclopedia of Packaging Technology J. Wiley & Sons 1986.

Primary Examiner—Steven Weinstein
Attorney, Agent, or Firm—Christensen, O'Connor, Johnson & Kindness

[57] ABSTRACT

A method for fumigating a produce commodity comprising packing the commodity in a vented fumigation container (10, 18, 30) that is constructed from a solid-wall material that is substantially free of contaminants that would bind fumigant gas, fumigating the container and commodity contained therein in a fumigation chamber (40), and shipping the fumigated commodity in the containers.

9 Claims, 19 Drawing Sheets

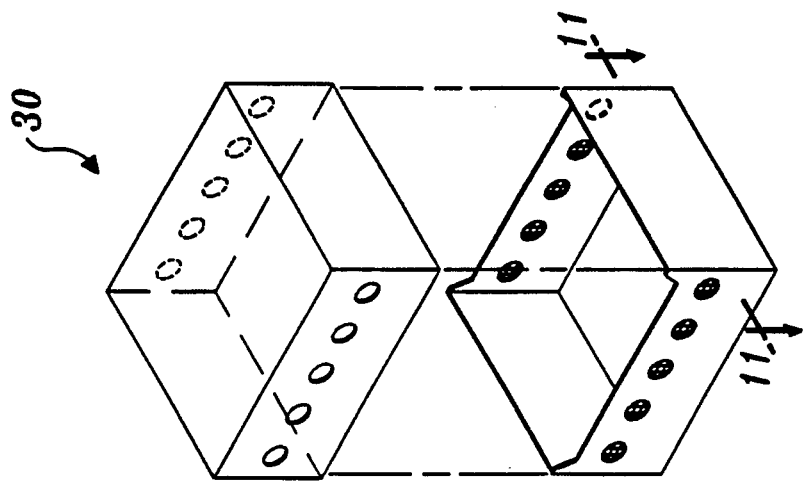
FIG.11
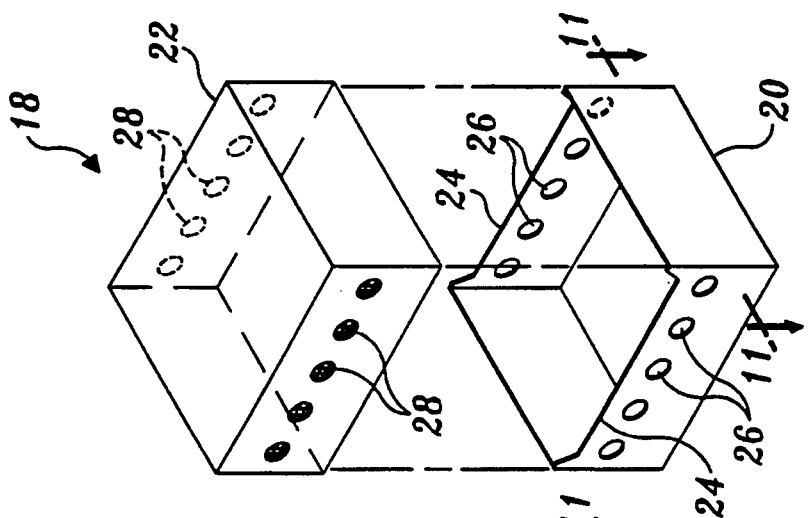
FIG.10
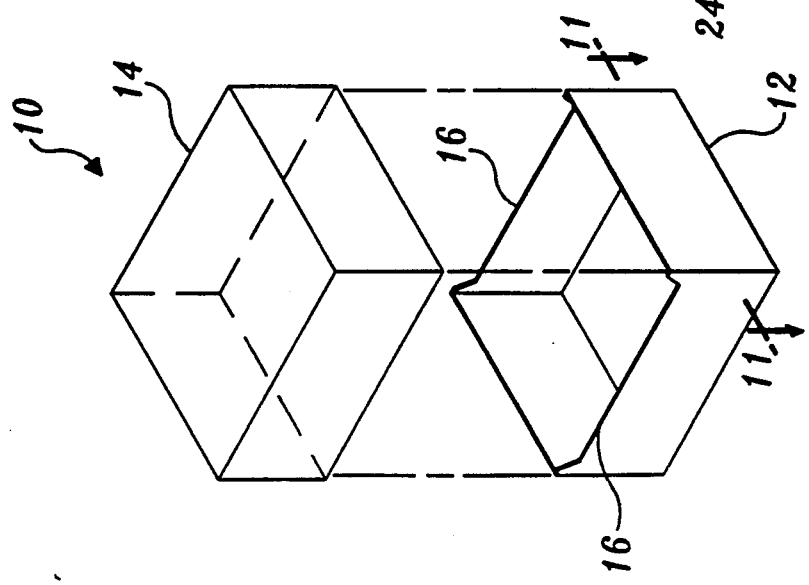
FIG.9
FIG.8

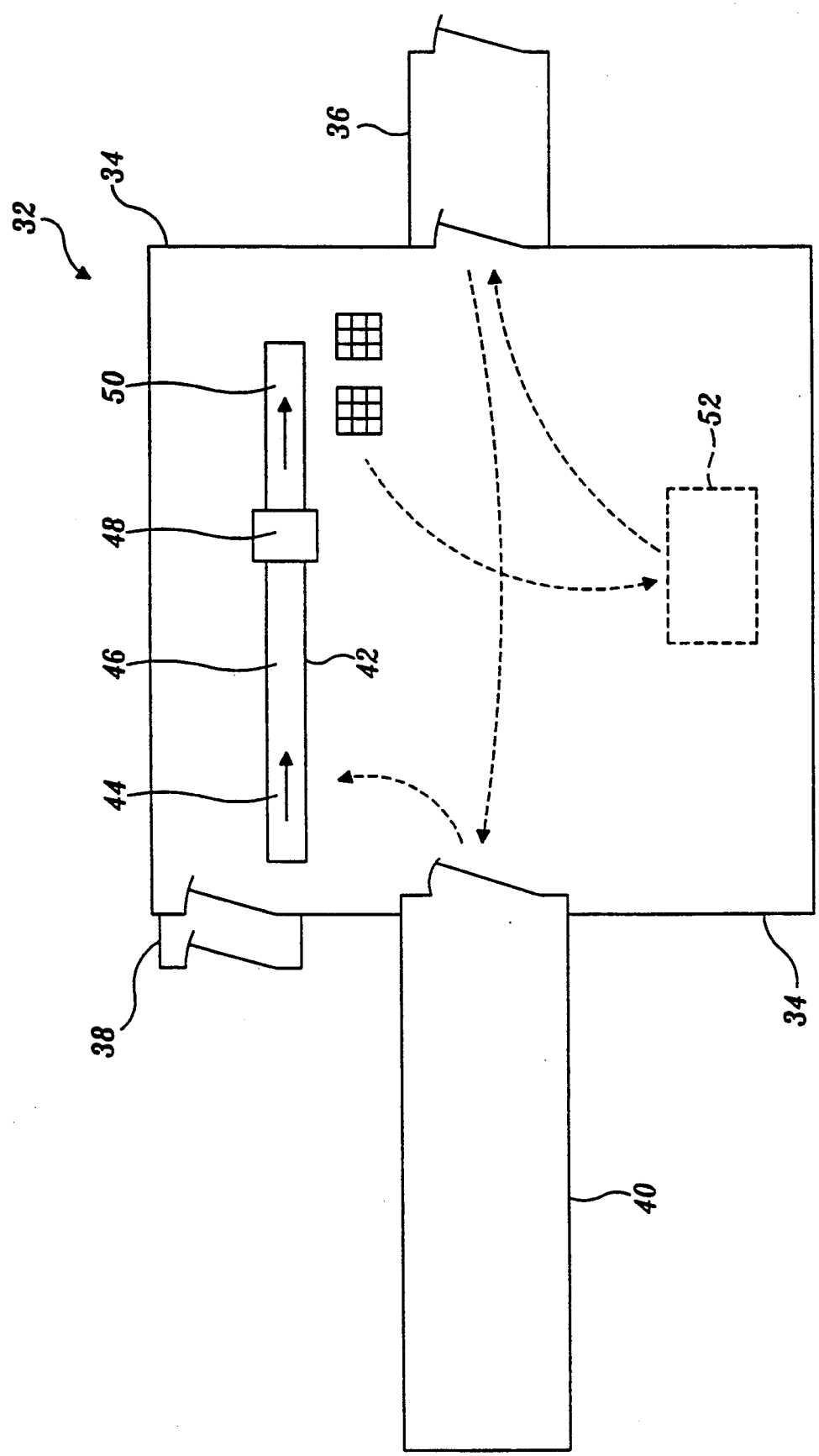

SELECTIVE FRUIT FUMIGATION METHODS

TECHNICAL FIELD

This invention relates to the fumigation of food commodities and, more particularly, to improved methods and apparatus useful in selectively fumigating fruit.

BACKGROUND OF THE INVENTION

Before domestically grown fruit may be shipped to certain foreign countries (e.g., Japan), the quarantine procedures established by the receiving country must be adhered to. These quarantine procedures vary with the type of fruit being shipped and with the ultimate destination, but each procedure calls for fumigation of the fruit prior to shipment.

Fumigation of the fruit typically occurs in a packing house similar to that schematically represented in FIG. 1. The packing house may be an enclosed-wall structure, or may be formed of a skeletal framework to which quarantine netting (similar to screen door material) is secured. Such packing houses are quite large, often exceeding 10,000 square feet in floor space and requiring as many as 60 workers.

Recently harvested fruit, called "field run" fruit, is delivered to the packing house either from an immediately adjoining orchard or from a relatively nearby orchard. The delivered fruit is normally housed within bulk storage bins capable of carrying 400 pounds or more of fruit.

The storage bins bearing fruit enter the packing house through an incoming air lock of double-door design, and then are placed directly into a fumigation chamber integral with the packing house. Certain fruit (e.g., apples) must be heated prior to fumigation. Thus, the fumigation chamber is equipped with a heating source. While the storage bins may be stacked several levels high within the chamber, certain countries place restrictions on the percentage of fumigation chamber volume that may be occupied during the fumigation process. For example, Japanese procedures mandate that no more than 50% of the fumigation chamber volume be occupied.

Once the chamber is loaded, the door to the fumigation chamber is closed and the fumigation process is conducted by introducing and circulating a mixture of air and methyl bromide gas throughout the chamber for a period of approximately two hours. The rate of circulation is such that a complete air exchange occurs approximately every 4-5 minutes.

At the beginning of the fumigation cycle, all entrances to the packing house are closed and the interior of the packing house is fogged with a food-grade insecticide (e.g., pyrethrin). Fogging takes approximately 15-20 minutes. Thereafter, a short spray of insecticide is emitted approximately every two hours. After the fogging process is completed, the packing house is classified as a "quarantine secure area."

Upon completion of the fumigation process, off-gassing is conducted. The door to the fumigation chamber is opened and the mixture of air and methyl bromide gas contained therein is vented through an exhaust stack coupled to the fumigation chamber. Venting directly to the atmosphere, using fresh air drawn into the chamber from the interior of the packing house, continues for a period of time sufficient to lower the methyl bromide exposure concentration level to 5 ppm, the currently recognized level established by the Environmental Protection Agency. Off-gassing typically takes four or more hours to complete.

After off-gassing, the storage bins are transported to a bin dump which deposits the fruit atop a fruit conveyor. Once positioned upon the fruit conveyor, the fruit next encounters a series of cluster cutters. Certain fruit (e.g., cherries) may come with two or more pieces of fruit connected together by their stems. The cluster cutters, which essentially are saw blades, are used to effect a separation so that each piece of fruit stands alone with a single stem. With many types of fruit, the cluster cutters are not employed (e.g., apples, nectarines, etc.).

The fruit is next conveyed to a grading area where defective fruit is removed and discarded. While the degree of defective fruit varies considerably, it is not unusual for 10% or more of the incoming fruit to be removed at the grading area. Graded fruit then enters a sizing area located at the terminal end of the fruit conveyor, at which point the flow of fruit is split into groups of different sizes. Each group of sized fruit is placed on one of a series of "runout" conveyors disposed adjacent the sizing area. For certain fruit (e.g., cherries), in-line hydrocooling is performed while the sized fruit travels along the runout conveyors.

At the terminal end of the runout conveyors, or so-called "packing area," the sized fruit is deposited within the bottom portions of conventional shipping boxes that are positioned atop automated volume fillers. When a preset weight is achieved within a box, the automated volume filler stops the associated runout conveyor until the fully loaded box is removed and an empty box is placed in position. As shown in FIGS. 2-4, conventional shipping boxes are of corrugated configuration and are composed of cardboard. For fruits that emit heat due to the maturing process during extended shipping periods (e.g., apples), a conventional shipping box having vents and screens must be employed to disseminate the buildup of heat and to prevent insect reinfestation (see FIG. 3).

The loaded shipping boxes are next placed on a box conveyor which transports the boxes past an inspection area to a box taper. At the inspection area, an authorized inspector takes a random sample to ensure that no quarantine pests exist and that the fruit is of the proper grade and size. Usually, a 1% sample is drawn. Beyond the inspection area, the top portion (or cover) of a conventional shipping box is placed over the bottom portion containing the fruit. A band of tape is then secured across the upper surface of this top portion of the conventional box at the box taper. The tape does not secure the two halves of the box together—it simply provides identification information relating to the packed fruit.

The packed fruit then travels to a palletizing area located at the terminal end of the box conveyor, the boxes of fruit being stacked to form pallets of manageable size. The fully loaded pallets are sent to a pallet netting area, where each pallet is placed on a rotating platform. A spool of plastic stretch-wrap netting, having holes formed in it which allow air to flow through, is wound around the exterior of the rotating pallet in a spiral fashion to produce a secured pallet that maintains its structural integrity during shipment. Alternatively, corner boards held in place by strapping may be used to secure the fully loaded pallets.

Secured pallets are removed from the packing house through an outgoing air lock of double-door design. As with the incoming air lock, this double-door design prevents airborne insects from entering the interior of the packing house. Pallets exiting the outgoing air lock may then be loaded directly onto shipping containers (e.g., railway, truck, etc.) or may be deposited into an adjoining cold storage area, from which they later will be shipped. Because certain fruit (e.g., apples) must be subjected to forced-air cooling prior to shipment, the cold storage area must possess this capability.

Fumigating fruit using the above-described packing house is generically represented in the process flow diagram of FIG. 5. All harvested fruit is directed to the fumigation chamber where "bulk fumigation" is conducted. This process is known as bulk fumigation because each and every piece of fruit is fumigated. The fumigated fruit is then graded and sized by packing house workers, and subsequently packed for shipment in conventional shipping boxes of corrugated cardboard design.

While quarantine treatment of fruit may be generically represented by FIG. 5, it must be noted that each particular fruit requires its own unique processing. Processing of cherries is represented in FIG. 6 (refer additionally to FIG. 1). As indicated, harvested cherries stored in open-top bins are directed to the fumigation chamber where bulk fumigation of the cherries is conducted. At the conclusion of the off-gassing cycle, the cherries are placed upon a fruit conveyor and transported to cluster cutters, where separation of connected cherries is effected. Downstream along this conveyor, the cherries are graded, sized, and transferred to a plurality of runout conveyors.

Along the runout conveyors the cherries are exposed to in-line hydrocooling to bring about a 34° F. core temperature. In the packing area, the bottom portion of a non-vented conventional shipping box of corrugated design is pre-lined with a plastic bag. The bag and box combination qualifies as a "quarantine-certified shipping box" for the shipment of cherries. The bag and box are then filled with fruit as the box sits atop the automated volume filler. When full, the top of the plastic bag is folded inwardly on itself and the box is placed on a box conveyor. If selected, the box is pulled from the box conveyor for inspection. If not, the box continues along the box conveyor to an area where a shipping box cover is applied and identifying tape is placed over the cover. The packed boxes are then palletized, pallet netting is applied, and the secured fully loaded pallets are then transported from the packing house to the cold storage area for storage and/or shipment.

With certain fruits, such as apples, there are no currently accepted quarantine procedures for many foreign countries. Thus, the shipment of apples to these foreign countries simply does not occur. However, there is a "proposed" quarantine procedure using current technology for sending apples to Japan, which is illustrated in FIG. 7. This procedure is quite similar to that for cherries illustrated in FIG. 6, but does have several important differences. First, prior to bulk fumigation, the apples must undergo 55 days of cold treatment, wherein a core temperature of approximately 34° F. or below (but not freezing) is maintained. Second, the apples must be heated to a core temperature of 10° C. (50° F.) or above prior to commencement of the bulk fumigation procedure. This heating step is normally accomplished within the packing house's fumigation chamber. Third, apples require no in-line hydrocooling prior to being packed. Fourth, apples must be packed in screened/vented conventional shipping boxes to allow the buildup of heat during shipment to be disseminated. Lastly, apples must be forced-air cooled in the cold storage area to approximately 34° F. core temperature prior to being shipped.

The above-described bulk fumigation approach to fumigating fruit is problematic. As stated, 10% or more of the incoming fruit may be culled at the grading area. Furthermore, only a fraction (perhaps 25%) of the fruit leaving the sizing area is of a quality sufficient to be sent to the foreign country imposing quarantine (fumigation) procedures. Consequently, the fumigated fruit not of sufficient quality must be sold in domestic markets at steep discounts. Because quarantine procedures do not apply to fruit grown and sold domestically, domestic markets simply are not very interested in fruit that has been fumigated.

The disadvantages of bulk fumigation do not stop here. Unnecessarily fumigating fruit means that higher amounts of methyl bromide are vented to the environment. It also means that packing house workers handling the fruit are exposed to more methyl bromide than is necessary. Furthermore, there currently are state and federal governmental efforts under way to completely eliminate exposure of workers to methyl bromide.

It has been suggested that fruit bound for foreign countries imposing quarantine procedures simply be graded and sized prior to fumigation. This way, only that fruit meeting the foreign standards need be fumigated. Unfortunately, this approach means that the fruit entering the packing house would be graded and sorted twice. Not only is this handling labor intensive, additional damage to the fruit is also caused. Accordingly, industry has declined to use this approach, opting instead for bulk fumigation.

It also has been suggested that "in-box fumigation" could overcome many of the problems associated with existing procedures. In-box fumigation requires that the fruit be packed, fumigated, and shipped in the same container. However, currently existing containers and procedures will not allow for in-box fumigation.

As shown in FIG. 4, a conventional shipping box of corrugated design has a plurality of flutes formed between opposing walls of the box. During fumigation, these flutes are filled with methyl bromide gas. During the off-gassing period, much of the methyl bromide gas remains trapped in these flutes. Thus, because the allowable exposure level of 5 ppm cannot efficiently be reached during the off-gassing process, conventional shipping boxes have not been approved as a quarantine-certified packaging material for in-box fumigation. An additional drawback of conventional shipping boxes of cardboard composition is that they do not retain structural integrity during extended shipping periods (due to moisture accumulation, etc.).

While containers formed of plastic and wood may technically qualify as quarantine-certified packaging materials, they possess other disadvantages. Plastic is much more expensive to produce than cardboard and would prohibitively add to the cost of fruit shipped in such containers. Further, the additional weight of a plastic container is undesirable. As for wood containers, the porous nature of wood does allow migration of methyl bromide through it, which results in essentially no retention of methyl bromide gas at the conclusion of the off-gassing period. However, this same porous nature provides a container that is susceptible to reinfestation during shipment.

As described above, current procedures for the fumigation of fruit are fraught with limitations and associated problems. This invention is directed to overcoming these problems.

SUMMARY OF THE INVENTION

In accordance with this invention, three generic methods for selectively fumigating a food commodity (particularly fruit) are disclosed. These methods include: (1) open-box selective fumigation; (2) closed-box selective fumigation; and (3) open-top selective fumigation using an existing fumigation-certified plastic container (picking lug). In contrast to existing bulk fumigation procedures, where all fruit entering a conventional packing house is fumigated, selective fumigation economically allows only that segregated fruit of a grade and size sufficient for shipment to foreign countries to be fumigated. Among other things, elimination of unnecessary fumigation results in added worker safety and less environmental damage.

Three versions of a solid-wall, wood fiber fumigation box used to practice the first two methods, and a fumigation facility having an improved fumigation chamber useful in practicing all three methods, are also disclosed.

BRIEF DESCRIPTION OF THE DRAWINGS

The foregoing aspects and many of the attendant advantages of the present invention will become more readily appreciated by reference to the following detailed description of the invention when taken in conjunction with the accompanying drawings, wherein:

FIG. 8 is an isometric view of a non-vented box of solid-wall configuration formed in accordance with the principles of the present invention;

FIG. 9 is an isometric view of a screened/vented box of solid-wall configuration formed in accordance with the principles of the present invention;

FIG. 10 is an isometric view showing an alternative version of the box shown in FIG. 9;

FIG. 11 is a cross-sectional plan view taken along line 11—11 of FIGS. 8-10;

FIG. 12 is a schematic plan view of a fumigation facility constructed in accordance with the principles of the present invention;

DETAILED DESCRIPTION OF THE PREFERRED EMBODIMENTS

Figure 1:
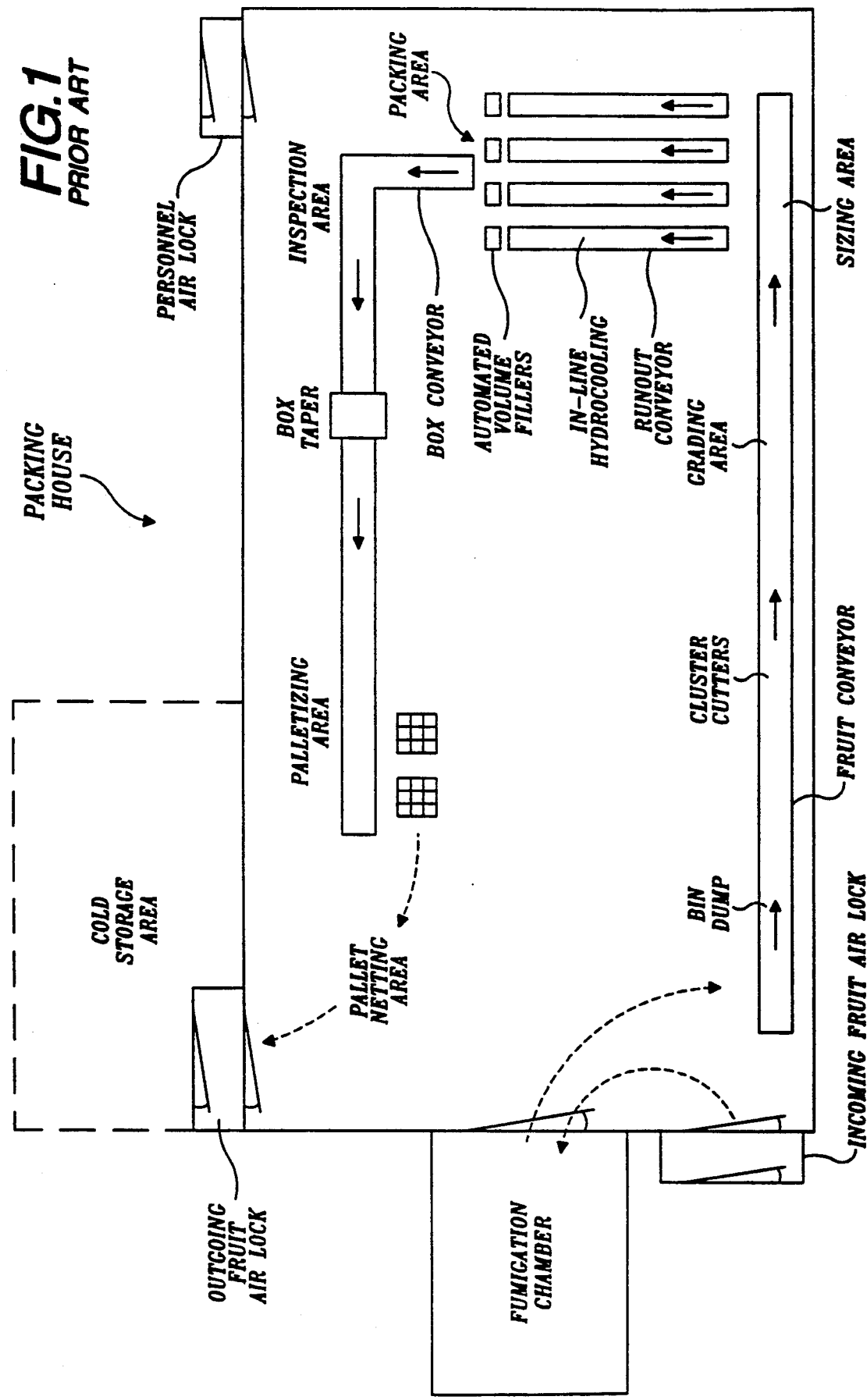
FIG. 1 is a schematic plan view of a typical packing house currently being used to fumigate and pack fruit.
Figure 3:
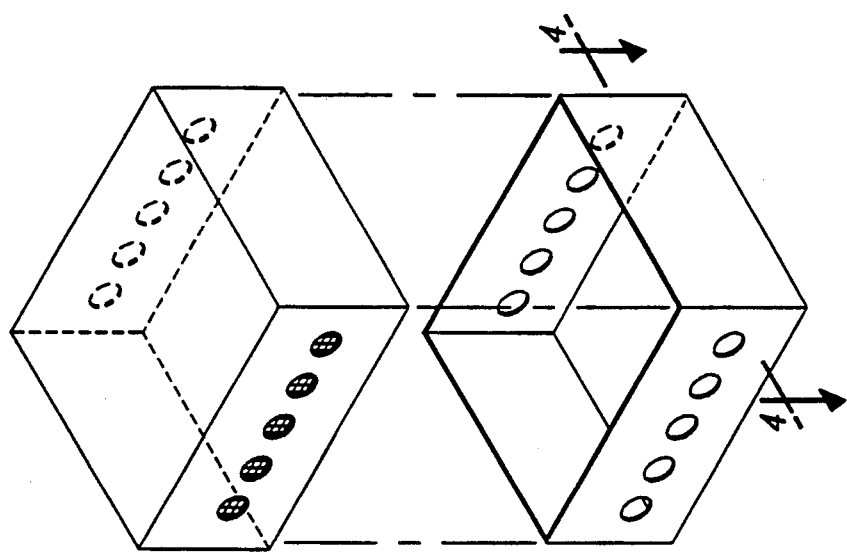
FIG. 3 is an isometric view showing a vented/screened conventional shipping box.
Figure 2:
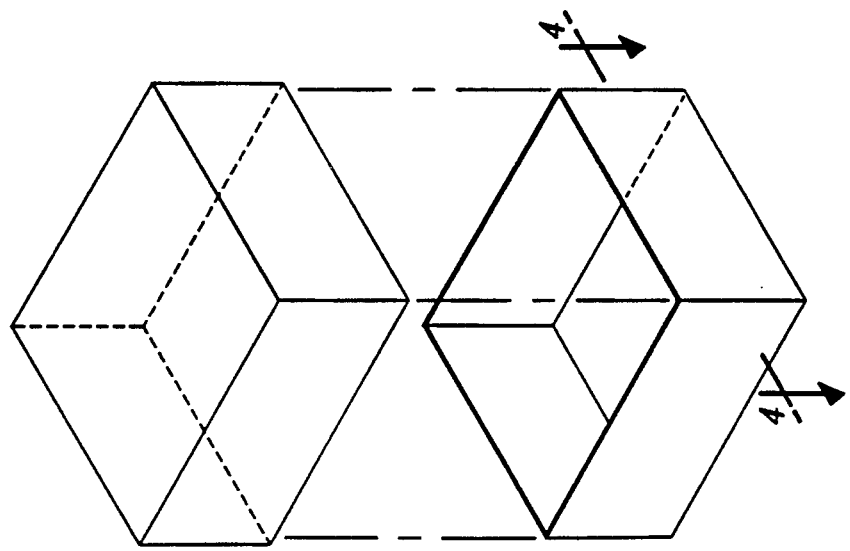
FIG. 2 is an isometric view showing a non-vented conventional shipping box.
Figure 4:
FIG. 4 is a cross-sectional plan view taken along line 4—4 of FIGS. 2 and 3.
Figure 5:
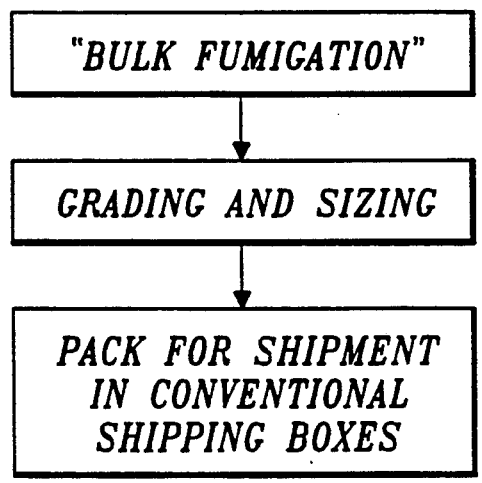
FIG. 5 is a generic flowchart showing current quarantine procedures used in the bulk fumigation of fruit.
Figure 6:
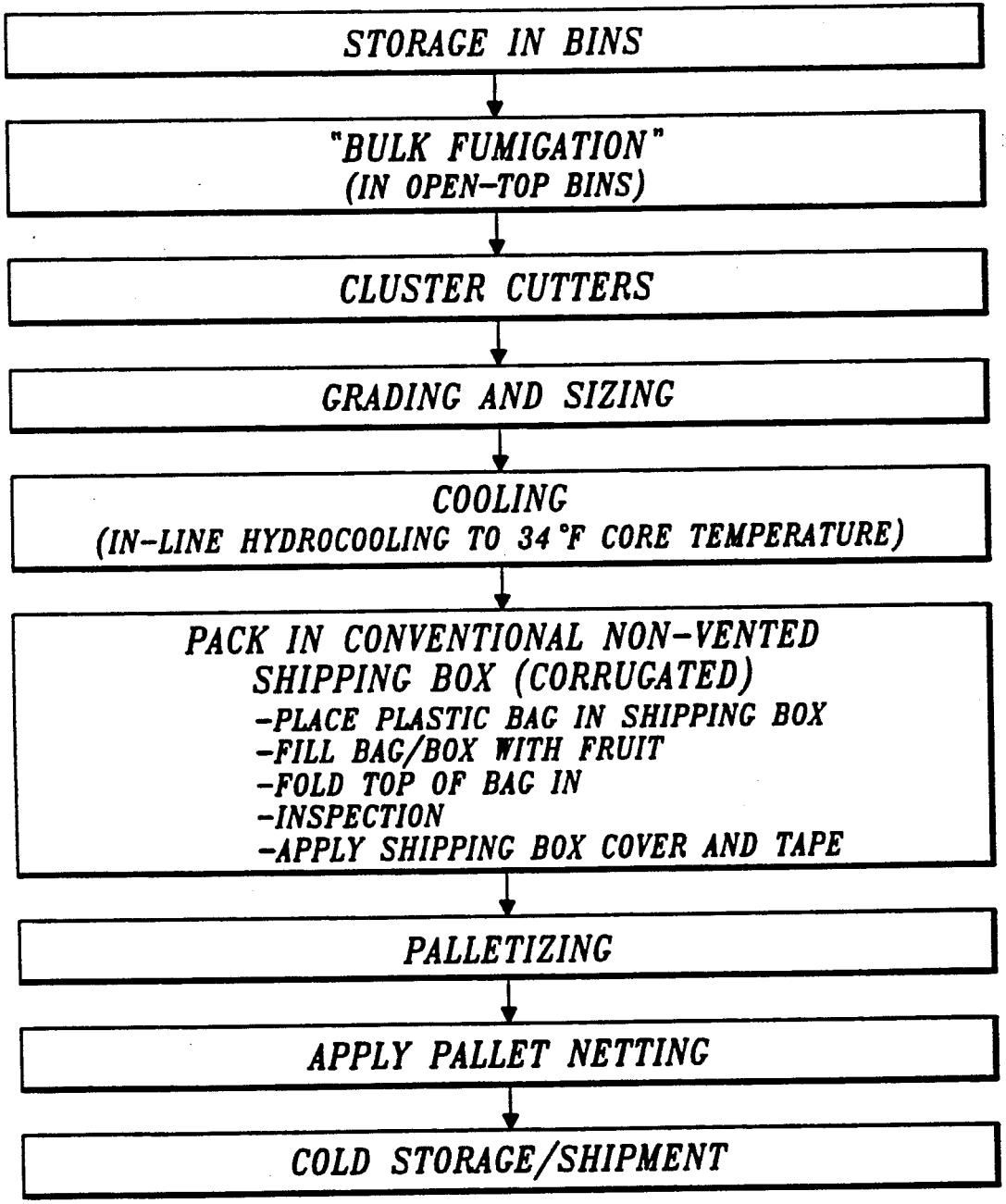
FIG. 6 is a more detailed flowchart showing current quarantine procedures used in the bulk fumigation of cherries.
Figure 7:
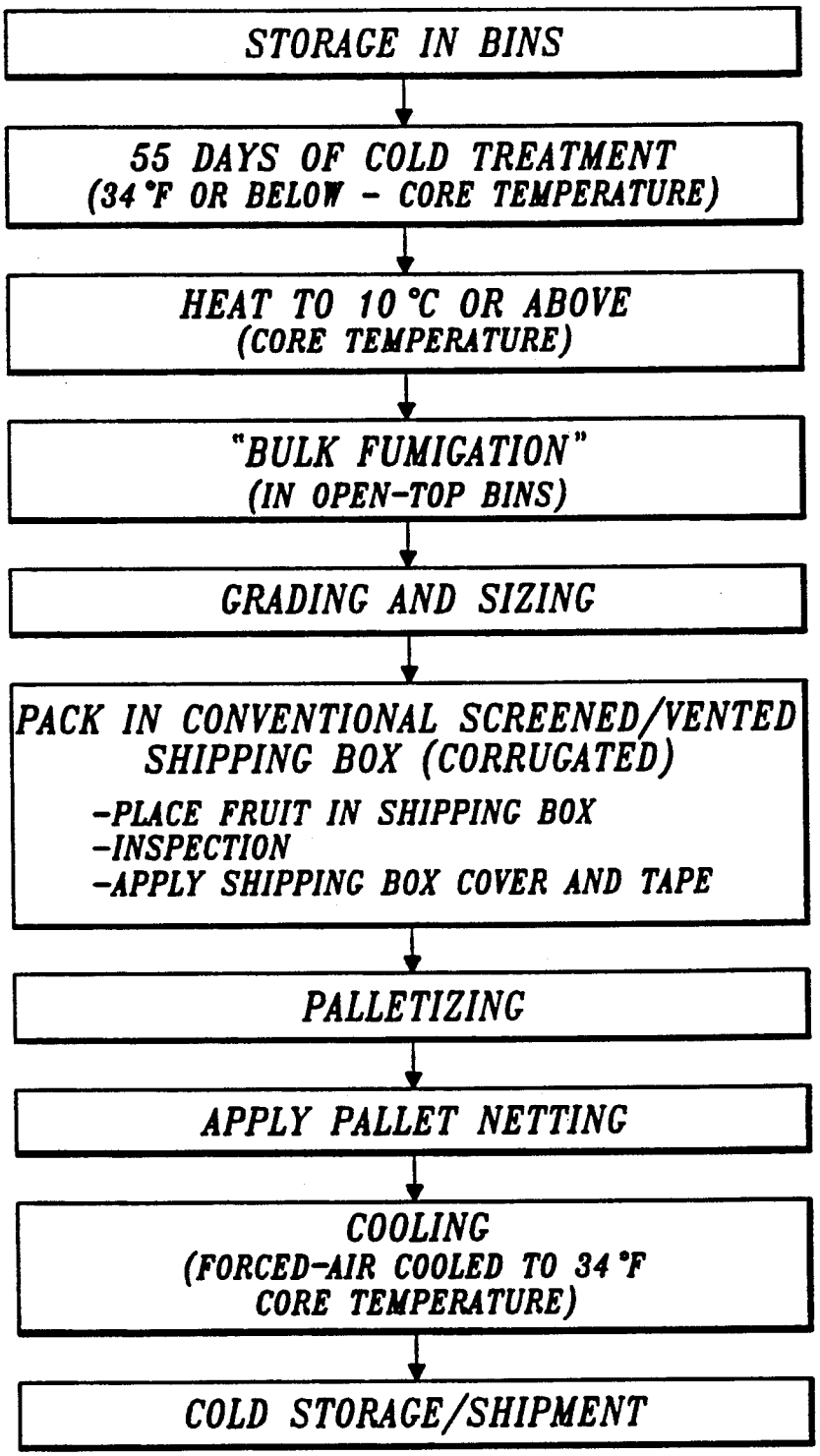
FIG. 7 is a more detailed flowchart showing proposed quarantine procedures that may be used in the bulk fumigation of apples.

As illustrated in FIG. 8 and described below, a non-vented box 10 formed in accordance with the present invention makes it possible for fruit contained therein to be "selectively fumigated." Box 10 has a bottom component 12 and a top component 14, the bottom component being sized to fit snugly within the top component. In other words, box 10 is a telescope box (i.e., a two-piece box in which the sidewalls of one part fit over those of the other). As viewed in FIG. 8, the sidewalls of bottom component 12 and top component 14 are of substantially similar vertical dimension. Box 10 is of rectangular cross section to make it more easily stackable. Two recessed edges 16 are formed in two opposing sidewalls of bottom component 12, the recessed edges extending nearly the entire length of the sidewalls in which they are formed.

As shown in FIG. 11, box 10 is of solid-wall design. Unlike conventional shipping boxes, box 10 contains no flutes or other void spaces susceptible to entrapping methyl bromide gas. Box 10 may be formed of a single homogeneous layer made from wood pulp, or may be formed of multiple layers laminated together with a water-resistant, food-grade glue. Preferably, a layer of polyethylene-coated paper is applied as an outer layer to one or both sides of the box 10. This combination makes for a tough material that is very resistant to abrasion and wet environments, thereby resulting in excellent structural integrity during shipment. Furthermore, this combination has proven effective as a barrier to other types of liquids and gases (e.g., methyl bromide). Preferably, the pulp used to produce box 10 is a combination of virgin fiber and recycled material containing substantially no contaminants. Certain contaminants may act to attract and/or bind methyl bromide. One such box found particularly effective is that produced by Rena Solid Fibre of Rena, Norway.

FIG. 9 illustrates a screened/vented box 18 that also may be used to selectively fumigate fruit. Like box 10, box 18 includes a bottom component 20, a top component 22, and recessed edges 24. Unlike box 10, box 18 contains a plurality of open vents 26 formed in two opposing sidewalls of bottom component 20. It also contains a plurality of screened vents 28 formed in two opposing sidewalls of top component 22, vents 28 being positioned to align with vents 26 when the top and bottom components are brought together. Alternatively, a screened/vented box 30, which simply reverses the component possessing the screened vents, may be employed.

FIG. 12 schematically represents a fumigation facility 32 formed in accordance with the present invention. Fumigation facility 32 may be employed in conjunction with a conventional packing house (see FIG. 1) to selectively fumigate fruit by the various methods described below. Typically, the fumigation facility 32 has floor space an order of magnitude smaller than that of a conventional packing house. Its operation requires just 6–8 workers. Fumigation facility 32 preferably is designed to be portable. Thus, it includes an easily assembled and dismantled skeletal framework 34 to which quarantine netting is secured. This design allows the fumigation facility 32 to be located atop any clean, substantially flat working surface (e.g., concrete, asphalt, etc.).

Fumigation facility 32 includes a large air lock 36 through which fruit enters and exits. The air lock 36 is of double-door design to prevent entrance of airborne insects into the interior of the fumigation facility. A smaller air lock 38, also of double-door design, is provided for the entrance and exit of workers.

A fumigation chamber 40 is peripherally coupled at one end to the skeletal framework 34 in a sealed fashion. Typically, the fumigation chamber 40 has a volume an order of magnitude smaller than that of the fumigation chamber integral with a conventional packing house. Preferably, the fumigation chamber is mounted to a wheeled chassis so that it is mobile. Disposed within fumigation facility 32 is a conveyor 42. Situated along the conveyor in downstream chronology are a packing area 44, an inspection area 46, a box taper 48, and a palletizing area 50. Also included within the interior of the fumigation facility is a pallet netting area 52.

Figure 13:
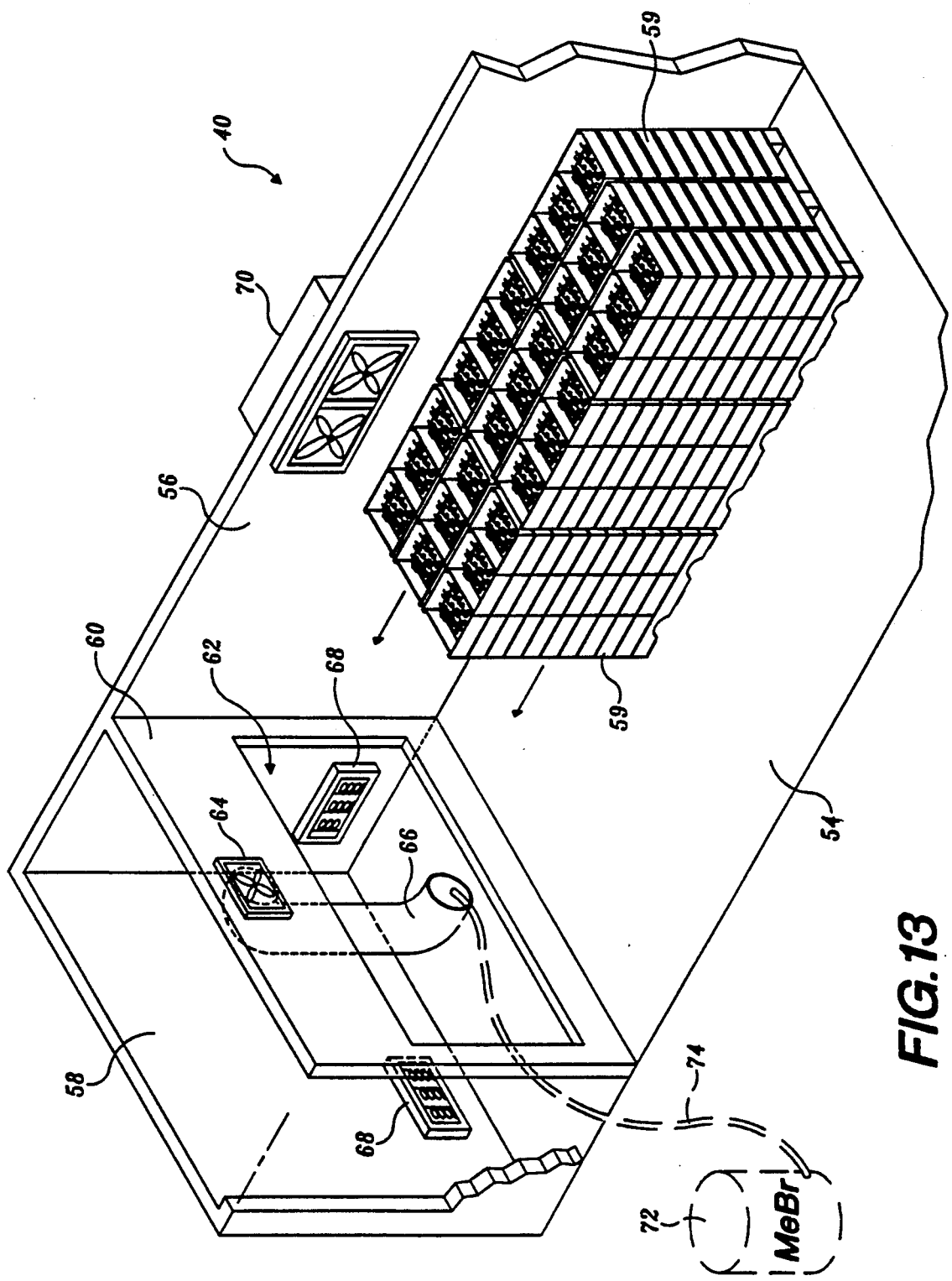
FIG. 13 is an isometric view, containing several cutaways, of a fumigation chamber constructed in accordance with the principles of the present invention.

Referring to FIG. 13, it is illustrated that fumigation chamber 40 is an enclosed chamber formed by a floor 54, a pair of spaced sidewalls 56, a pair of spaced end walls 58, and a ceiling (not shown). The sidewalls 56 are spaced to just accommodate two fully loaded pallets 59 in side-by-side orientation, the pallets being transported from the packing house and positioned within the fumigation chamber as described below. The ceiling is spaced from the floor 54 such that two or three feet of open space exists above the pallets. Fully loaded pallets have a height of approximately six feet.

A bulkhead 60, which extends from sidewall to sidewall and ceiling to floor, is disposed a few feet toward the center of the chamber from the end wall 58 located distal the chamber's connection with skeletal framework 34. A large rectangular opening 62 is formed in the lower portion of bulkhead 60, the opening extending to within a few inches of sidewalls 56 and floor 54.

A high-capacity circulation fan 64 is centrally mounted within bulkhead 60 at a location above opening 62. A circular duct 66 has its upper end coupled to the intake side of the circulation fan, and has its lower end positioned slightly above the bottom sill of opening 62 at a location slightly toward the nearer of the two end walls 58 from a plane defined by bulkhead 60. When loaded pallets 59 are positioned against the bulkhead, the above-described design causes the air discharged from circulation fan 64 to be blown to the back of the chamber, pass through the openings in the pallets, and then be drawn into the lower end of duct 66. Absent the duct, air discharged from the circulation fan would take the path of least resistance and be drawn through opening 62 without passing to the back of fumigation chamber 40. Should this occur, proper fumigation of the fruit in pallets located at the back of the chamber would not be accomplished.

The capacity of circulation fan 64 is matched to the volume of fumigation chamber 40 such that a complete volume exchange occurs within the chamber at least every two minutes. Preferably, a complete volume exchange is effected approximately every 45 seconds. The capacity of circulation fan 64 must not be too high, however, otherwise dehydration of the fruit will occur.

A pair of heating units 68 is mounted within the small area between bulkhead 60 and its nearer end wall 58 at a location just above floor 54. Heating units 68 may be simple heating coils, or may be any other applicable conventional heating source. While FIG. 13 illustrates a single cooling unit 70 mounted to a sidewall 56 in the upper regions of fumigation chamber 40, a plurality of such cooling units is preferably employed. Cooling unit 70 is of cooling-coil design and functions by drawing air in from the fumigation chamber, passing it over coils containing a cooling substance (e.g., Freon), and returning the cooled air to the chamber. As with the heating units, the cooling units may be any other conventional cooling source that adequately provides the required cooling function for the fumigation chamber. It is even possible that one or more combination heating/cooling units be employed.

Methyl bromide is converted to gas form in a volatilizer 72 located external to the fumigation chamber 40 (see FIG. 13). Methyl bromide gas is introduced into the lower open end of duct 66 via tubing 74 extending from the volatilizer.

Selective fumigation may be practiced by one of three generic approaches: (1) "open-box" fumigation using any of the boxes of the present invention; (2) "closed-box" fumigation using the screened/vented boxes of the present invention; and (3) "open-top" fumigation using existing picking lug containers. A general discussion of each approach, along with a more specific discussion directed to the treatment of cherries and apples under each approach, is provided below.

Figure 14:
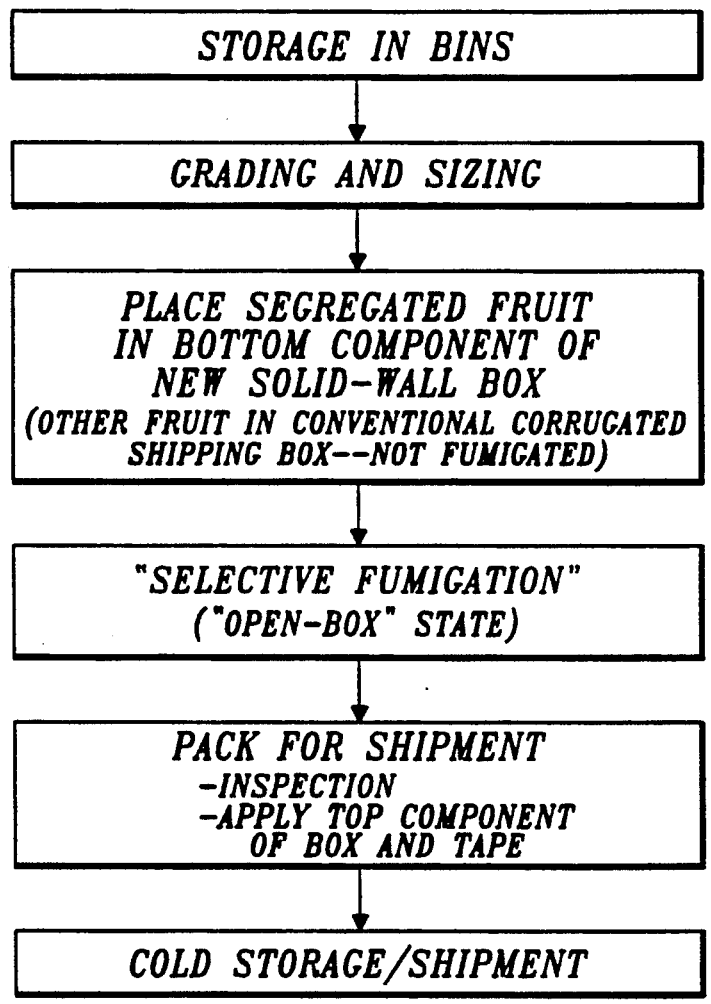
FIG. 14 is a generic flowchart showing a procedure, conducted in accordance with the principles of the present invention, for selectively fumigating fruit in an open-box manner.

The generic process for selective fumigation in an "open-box" state using the boxes of the present invention is represented in FIG. 14. While this process may be practiced either with a non-vented box 10 or with a screened/vented box 18 (or its alternative, box 30), it will be assumed for purposes of the following generic discussion that a non-vented box is employed.

Referring additionally to FIG. 1, it will be appreciated that fruit contained in bulk storage bins is delivered to the interior of the packing house. However, rather than being directed to the packing house's fumigation chamber, the incoming fruit is directly deposited onto the fruit conveyor at the bin dump. It subsequently passes through the cluster cutters, grading area, and sizing area. The graded and sized fruit is then positioned on an appropriate runout conveyor which directs the fruit toward the associated automated volume filler. For certain fruit (e.g., cherries), in-line hydrocooling is conducted along the runout conveyor.

Fruit on the particular runout conveyor that is of a grade and size sufficient to be exported to a foreign country requiring fumigation is deposited within the bottom component 12 of non-vented box 10 as it rests atop the automated volume filler. As described below, this segregated fruit is sent to fumigation facility 32.

The fruit not of the requisite grade and size, but acceptable for domestic markets, is deposited within conventional shipping boxes. These conventional shipping boxes are then transferred to the box conveyor and are packed, inspected, taped, palletized, netted, and stored/shipped in the conventional manner described in the Background section. Thus, the great majority of fruit entering the packing house is processed without unnecessary fumigation. This significantly adds to worker safety because handling of fumigated fruit is completely eliminated within the packing house. It also significantly reduces damage to the environment because unnecessary evacuation of methyl bromide gas is eliminated. Furthermore, it yields fruit bound for domestic markets that has not been fumigated, and therefore need not be discounted.

Figure 15:
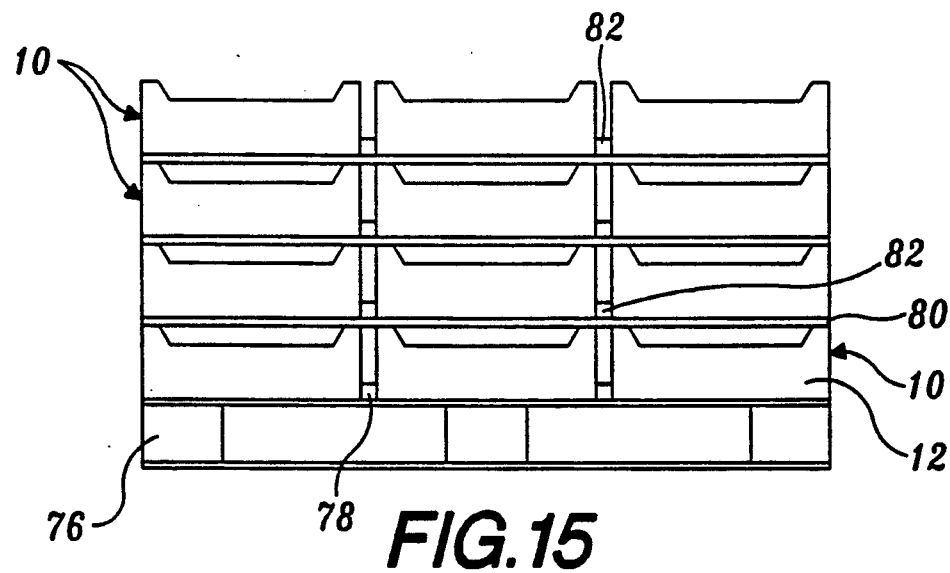
FIG. 15 is a side view illustrating a partially built pallet, the pallet being formed using the bottom component of the box shown in FIG. 8.
Figure 17:
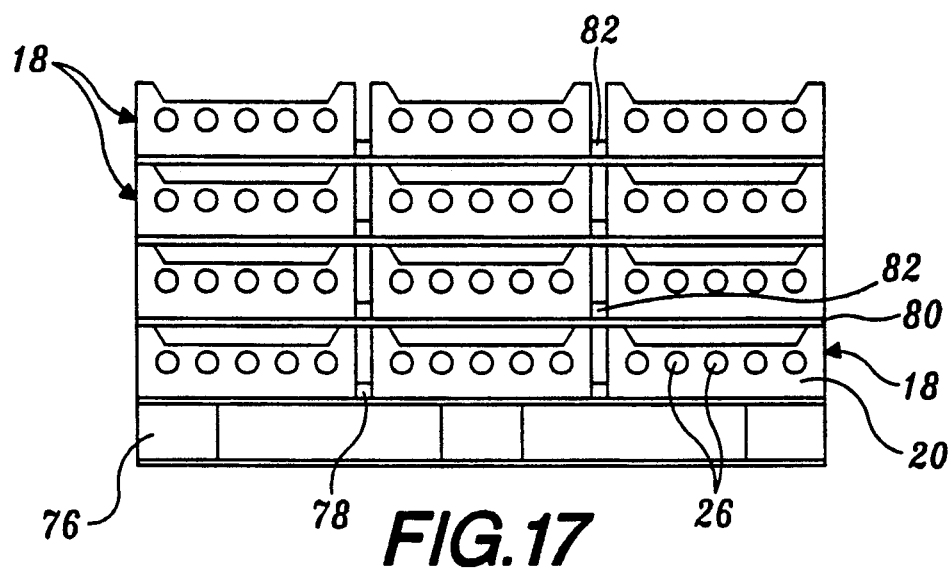
FIG. 17 is a side view illustrating a partially built pallet, the pallet being formed using the bottom component of the box shown in FIG. 9.
Figure 16:
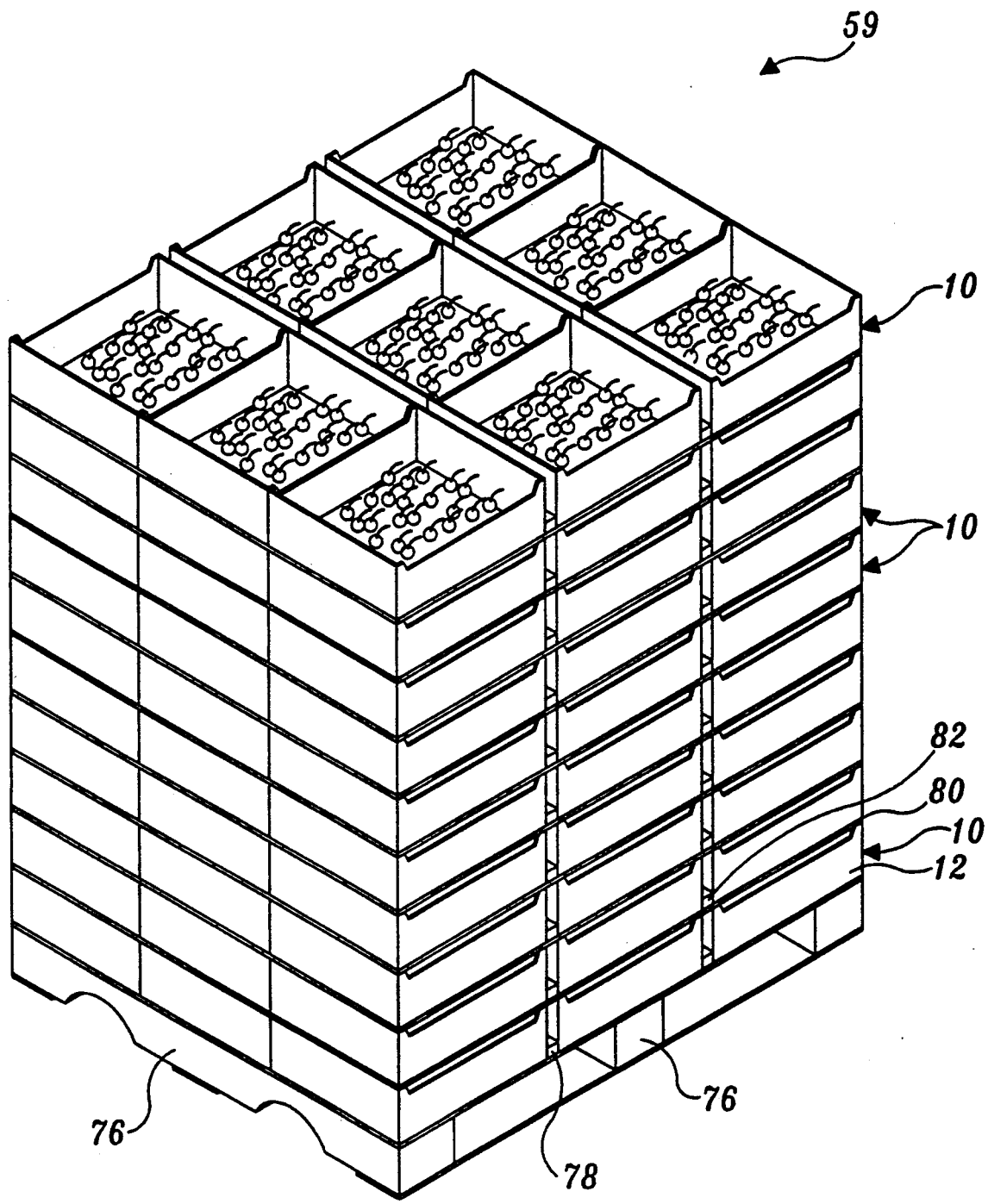
FIG. 16 is an isometric view of a fully built pallet, the pallet being formed using the bottom component of the box shown in FIG. 8.

The segregated fruit that is to be fumigated in an open-box state is palletized prior to being transported to the fumigation facility 32. Referring to FIGS. 15 and 16, a fully loaded pallet 59 is built by creating a first layer of non-vented boxes 10 bearing fruit atop a forklift-compatible base 76. The boxes are placed adjacent a pair of properly spaced guide strips 78 secured to the upper surface of base 76. To form the next layer of boxes a support sheet 80, having a pair of properly spaced guide strips 82 secured to its upper surface, is set atop the underlying layer of boxes. This process is repeated until a fully loaded pallet 59 of appropriate height is created (see FIG. 16). Thus, fully loaded pallet 59 is a build-as-you-go structure. To help ensure the integrity of pallet 59 during the normally short transport to fumigation facility 32, pallet netting may be wrapped by hand around the periphery of the pallet. A partially built pallet, formed instead of screened/vented boxes 18, is illustrated in FIG. 17.

While not clearly illustrated in FIG. 15, support sheet 80 is perforated to allow passage of air therethrough. Perforated masonite has been found to be particularly useful as a material of construction for support sheet 80. Masonite is a high-density particle board, which is essentially both waterproof and gasproof. The thickness of support sheet 80 must be sufficient to provide the necessary structural support, but should not be so great that undue weight is added to the pallet. With masonite as the material of construction for the support sheet, it has been found that a thickness of ⅛ inch is sufficient.

Referring now to FIG. 12, the fully loaded pallets 59 containing open-top, non-vented boxes 10 are moved to the interior of fumigation facility 32 through air lock 36. Once inside, the pallets are positioned within fumigation chamber 40 and the fumigation process, and subsequent off-gassing, are effected. The pallets are then transported to the packing area 44 where the top components 14 of boxes 10 are applied. Boxes 10 travel along conveyor 42 past the inspection area 46 to box taper 48, where for each box identifying tape is applied to the upper surface of top component 14. Boxes 10 then continue along conveyor 42 to palletizing area 50, where the boxes are re-palletized in a manner identical to that described above. The loaded pallets are taken to pallet netting area 52 for the application of netting to ensure pallet integrity during subsequent shipment. The pallets are then transported out of fumigation facility 32 through air lock 36 either to the cold storage area of the packing house or directly to shipment vehicles.

Figure 18:
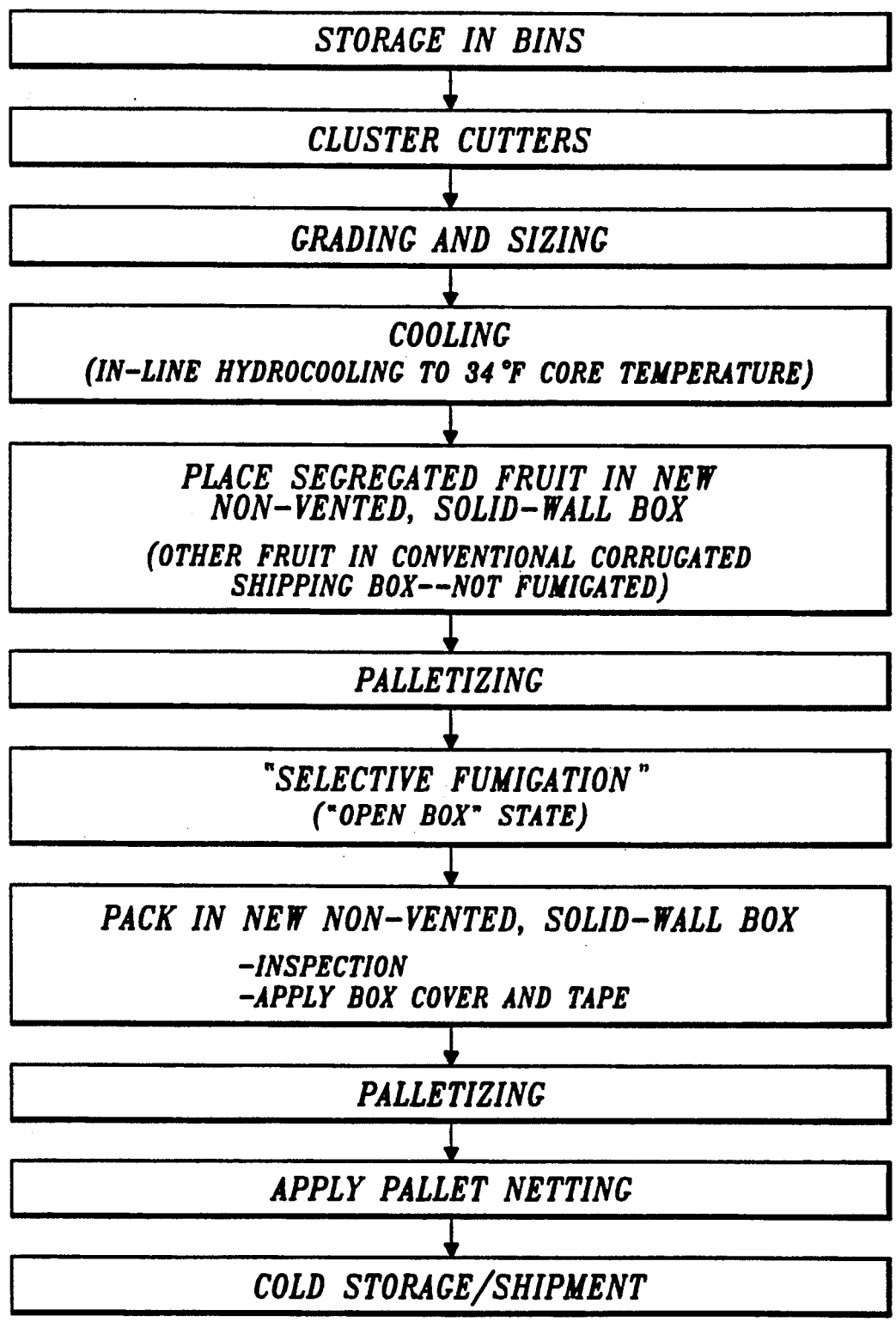
FIG. 18 is a more detailed flowchart showing the generic process of FIG. 14 applied to cherries.

The process for selectively fumigating in an open-box state, as applied to cherries, is represented in FIG. 18. Fumigated cherries bound for foreign countries are shipped by air and, therefore, a significant amount of heat is not emitted during transit. Accordingly, non-vented boxes 10 may be employed. As illustrated, cherries are generally processed in accordance with the generic open-box selective fumigation approach shown in FIG. 14, and therefore the above-identified advantages over prior art approaches exist. Additionally, the inventive approach allows the plastic bag used in existing procedures to encapsulate the cherries to be eliminated. Cherries are unique in that they require in-line hydrocooling along the runout conveyers to lower the core temperature of the cherries to approximately 34° F.. Cooling of the cherries at this point means that no forced-air cooling need be applied in the cold storage area.

Figure 19:
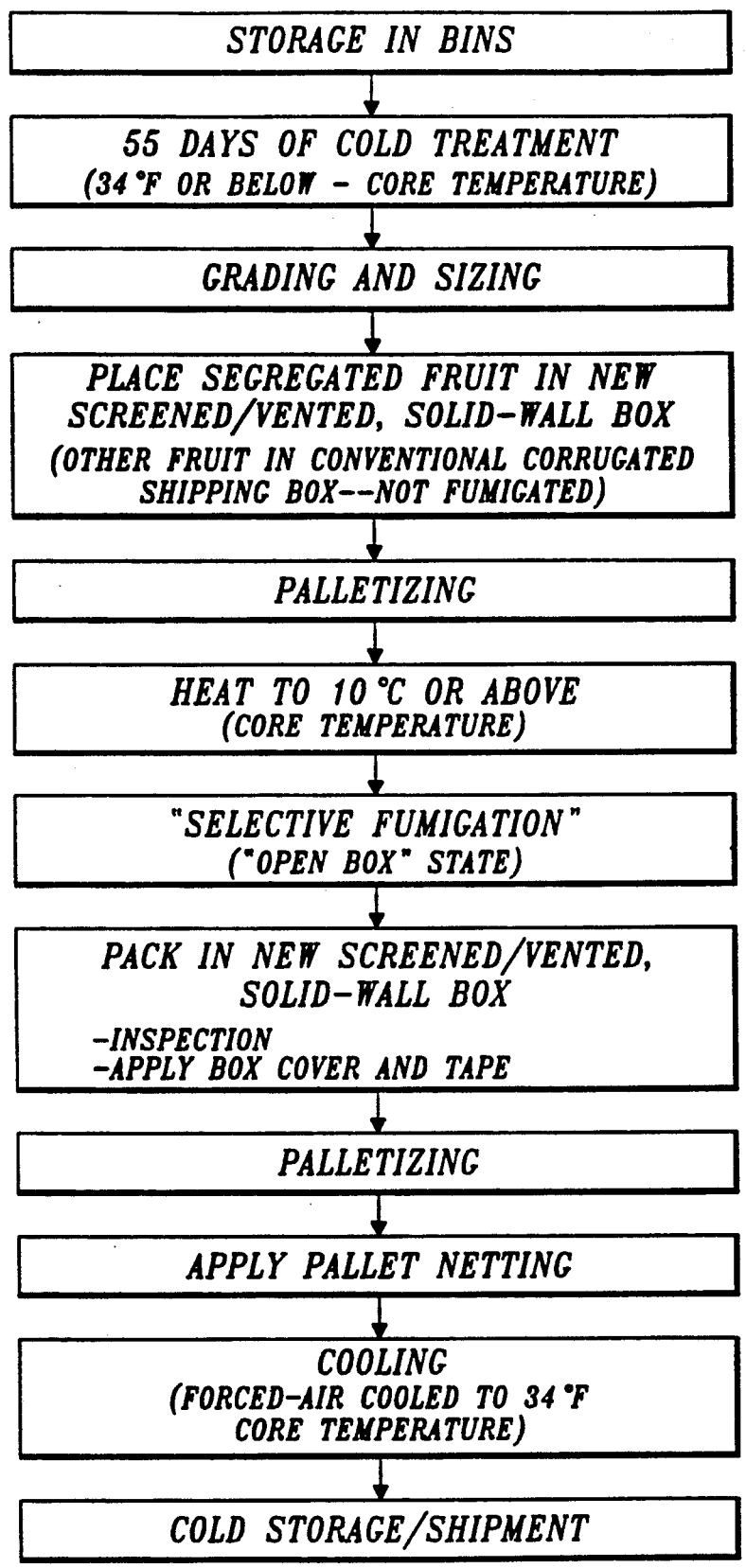
FIG. 19 is a more detailed flowchart showing the generic process of FIG. 14 applied to apples.

The process for selectively fumigating in an open-box state, as applied to apples, is represented in FIG. 19. Because fumigated apples bound for foreign countries are normally shipped by boat, a significant amount of heat is emitted during this longer period of transit. Accordingly, screened/vented boxex 18 (or their alternative, boxes 30) are employed. As illustrated, apples are generally processed in accordance with the generic open-box selective fumigation approach shown in FIG. 14, and therefore the above-identified advantages over prior art approaches exist. Processing of apples is unique in that certain foreign countries (e.g., Japan) may require a 55-day cold treatment period, during which the core temperature of the apples is maintained at or slightly below 34° F. Apples also must be heated to 10° C. (50° F.) or above prior to being fumigated. This heating step is most efficiently accomplished within the fumigation chamber 40 of the fumigation facility 32. Lastly, apples require forced-air cooling within the cold storage area prior to shipment.

Figure 20:
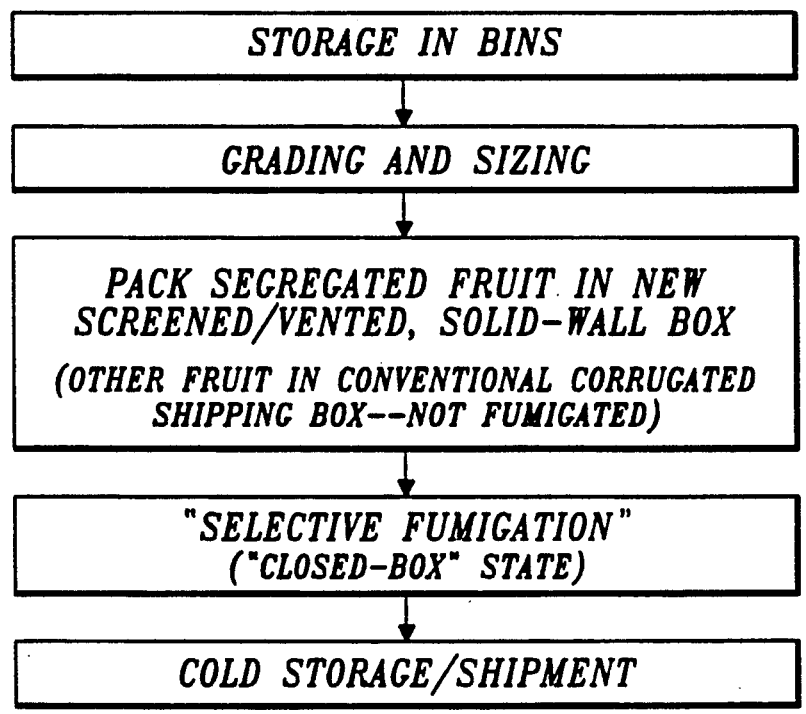
FIG. 20 is a generic flowchart showing a procedure, conducted in accordance with the principles of the present invention, for selectively fumigating fruit in a closed-box manner.

The generic process for selective fumigation in a "closed-box" state, the so-called second approach, is represented in FIG. 20. Because fruit is housed within a closed box at the point of fumigation, a screened/vented box 18 (or its alternative, box 30) must be employed. Closed-box selective fumigation is quite similar to the open-box selective fumigation process described above (the so-called first approach), but does possess a few major differences.

Figure 21:
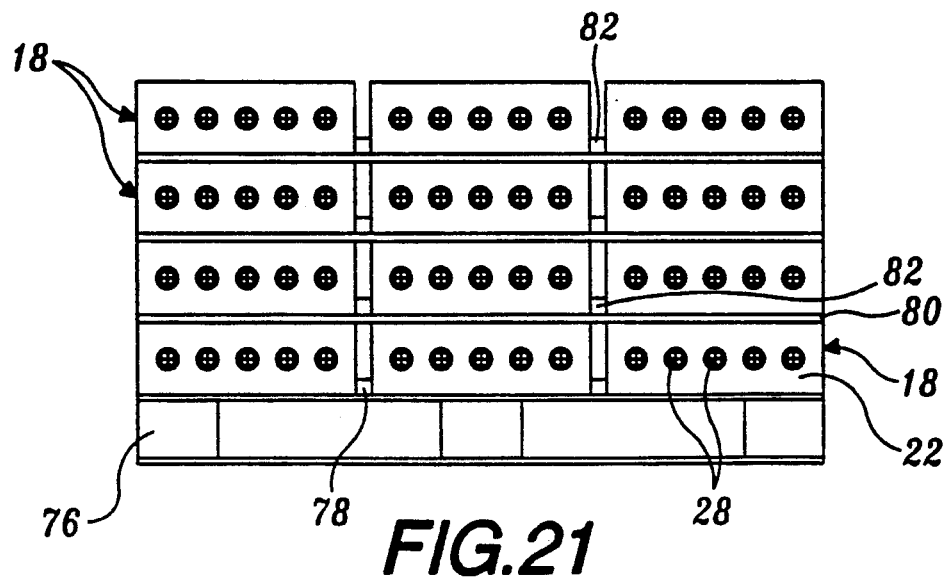
FIG. 21 is a side view illustrating a partially built pallet, the pallet being formed using both the top and bottom components of the box shown in FIG. 9.

Up through the position of the automated volume fillers in the packing house, the processes are identical. However, at the packing area the processes begin to diverge. Rather than being palletized and diverted to the fumigation facility 32, as in the open-box first approach, the bottom components 20 of the screened/vented boxes 18 bearing fruit to be fumigated are transferred to, and continue along, the packing house's box conveyor. As they do so, the top component 22 is applied, inspection (if any) occurs, the upper surface of top component 22 is marked with identifying tape, and the fully packed screened/vented boxes 18 proceed to the palletizing area. At this point, pallets of fully packed boxes are built (see FIG. 21).

Referring to FIG. 12, these pallets are transported to the fumigation facility 32 and positioned within fumigation chamber 40. At the completion of the fumigation process and subsequent off-gassing, the pallets need not be directed to the packing area 44, nor travel along conveyor 42 past the various work stations, because each of these processes has already been performed within the packing house. Thus, the pallets may be taken directly from the fumigation chamber to pallet netting area 52 for the application of netting to ensure pallet integrity during subsequent shipment. The netted pallets are then transported out of fumigation facility 32 either to the cold storage area of the packing house or directly to shipment vehicles.

Accordingly, it will be appreciated that the closed-box selective fumigation process possesses the same advantages as does the open-box process, plus a few additional advantages. For example, no re-palletizing step within the fumigation facility 32 is required. Further, under the closed-box approach, the workers within the fumigation facility are completely isolated from contact with fumigated fruit. Conversely, in the open-box approach there is the potential for minimal contact because the top component of the box must be applied by workers. This difference takes on monumental importance should worker exposure to methyl bromide be eliminated in the future.

Figure 22:
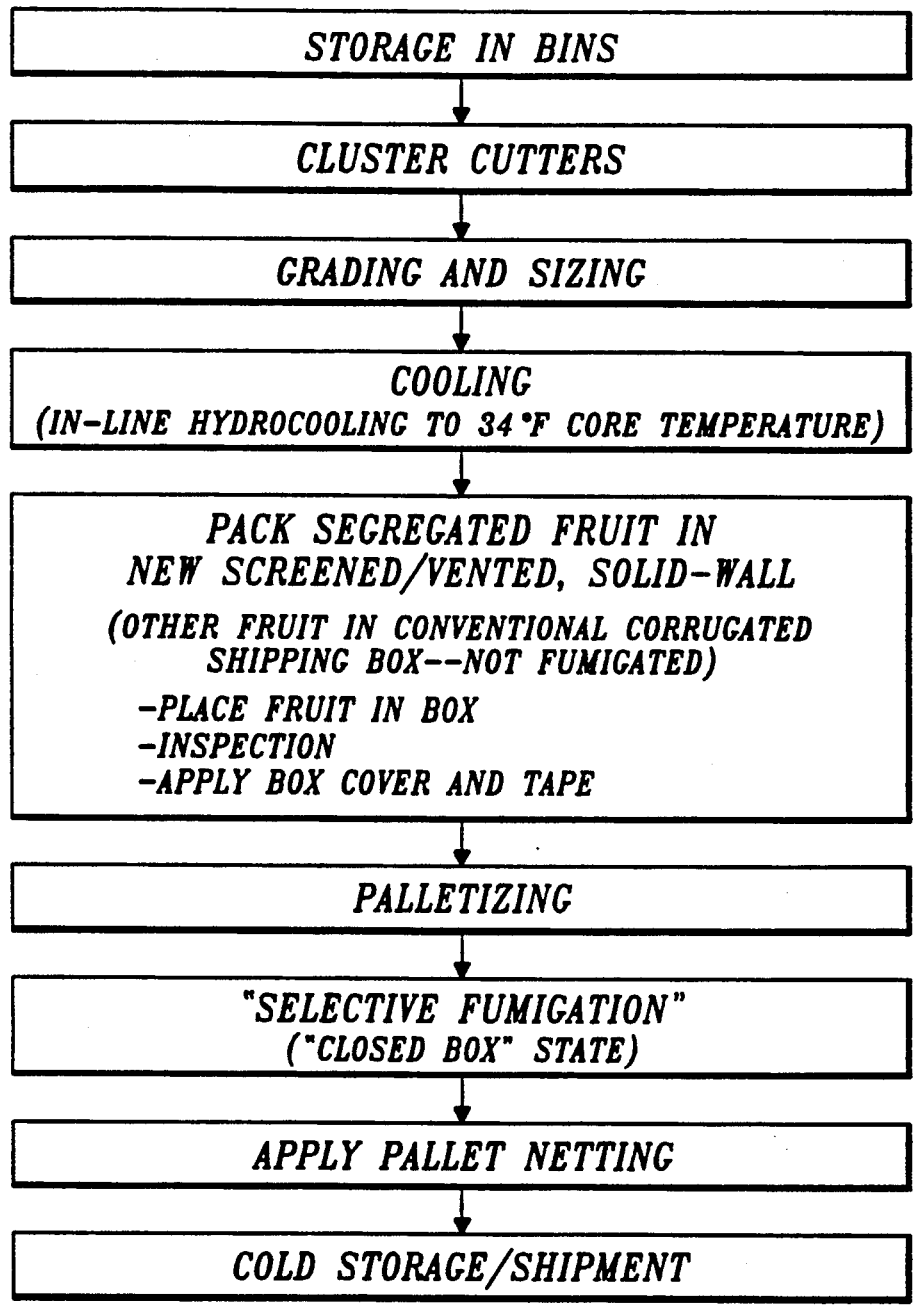
FIG. 22 is a more detailed flowchart showing the generic process of FIG. 20 applied to cherries.
Figure 23:
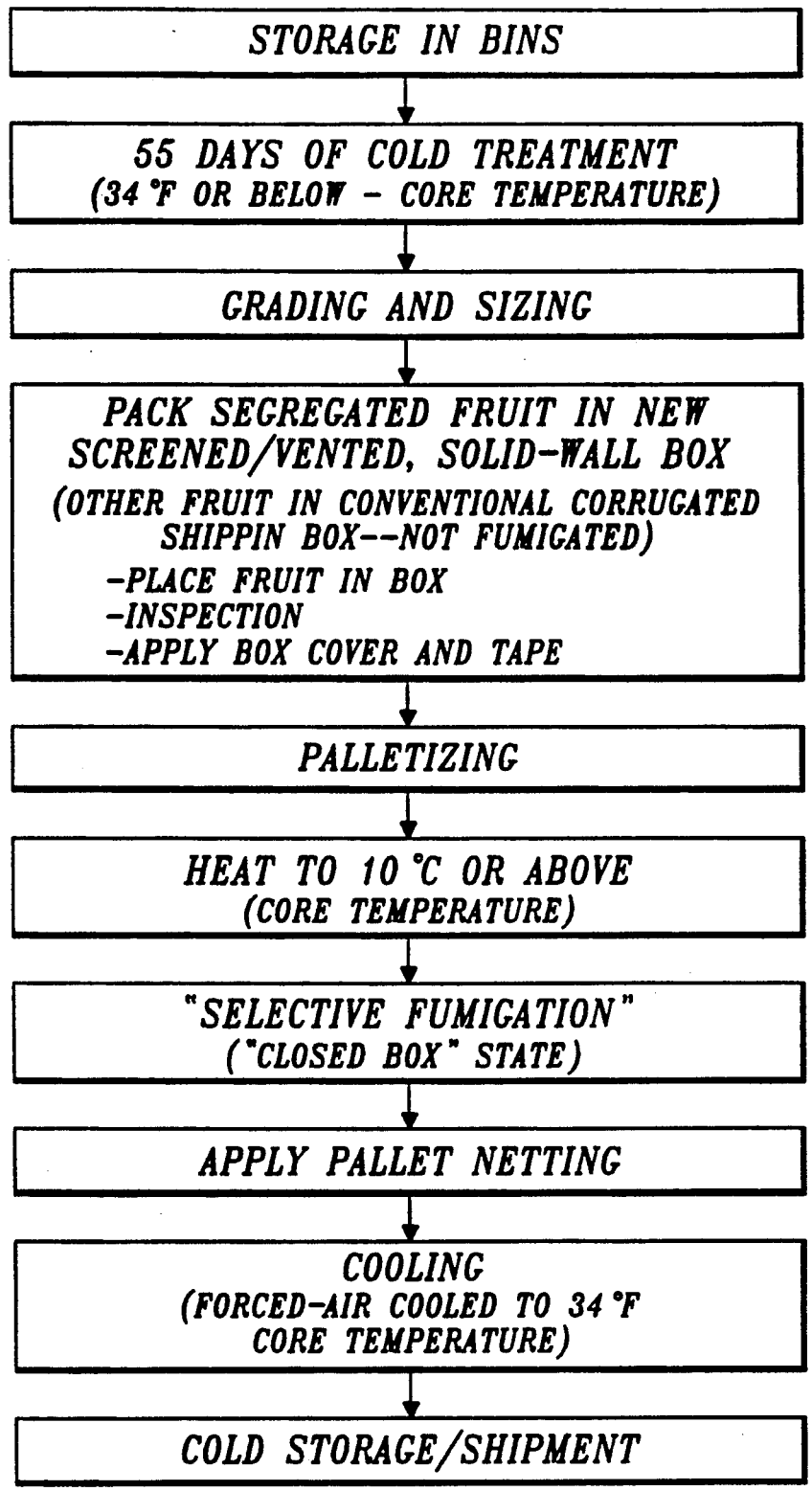
FIG. 23 is a more detailed flowchart showing the generic process of FIG. 20 applied to apples.

The process for selectively fumigating in a closed-box state, as applied to cherries, is represented in FIG. 22, whereas that for apples is represented in FIG. 23. These processes possess the fruit-specific treatments described above, only applied under the generic closed-box selective fumigation approach.

Figure 24:
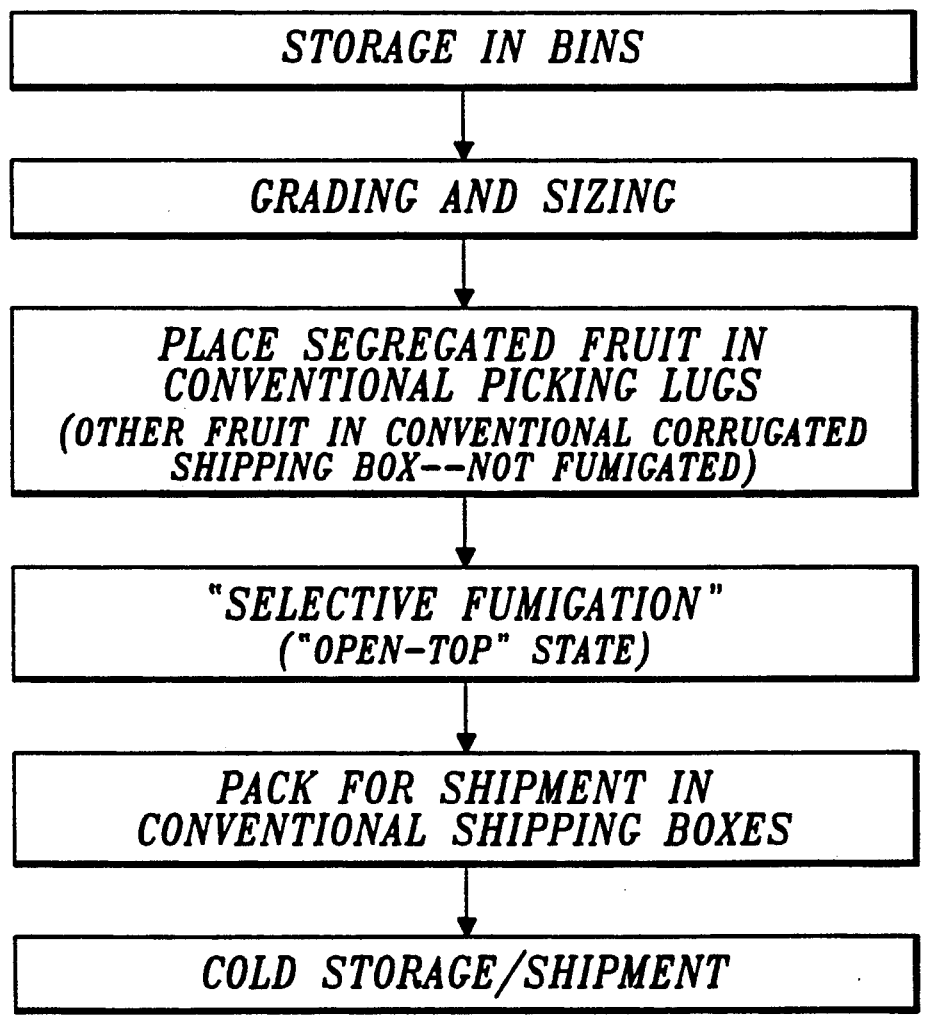
FIG. 24 is a generic flowchart showing a procedure, conducted in accordance with the principles of the present invention, for selectively fumigating fruit in an open-top manner using conventional picking lugs.
Figure 25:
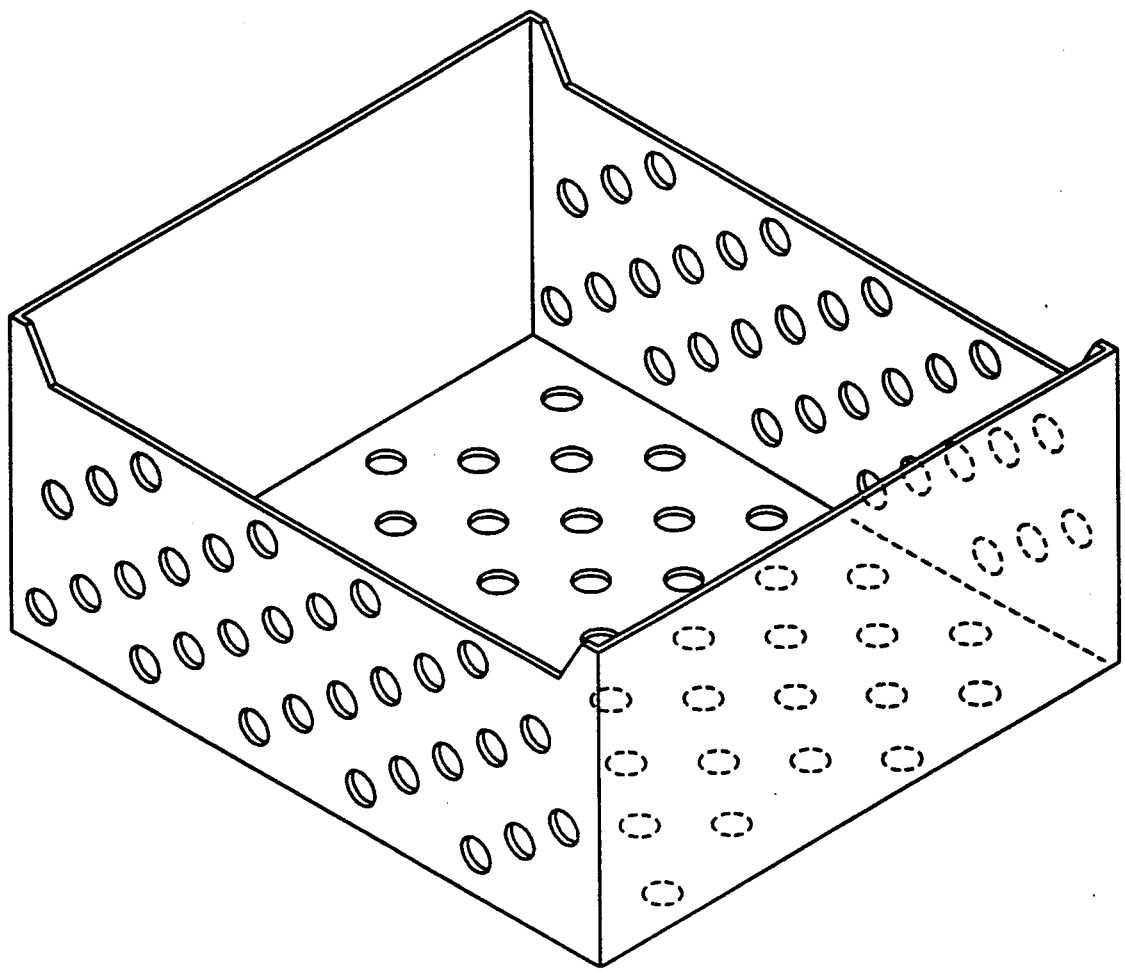
FIG. 25 is an isometric view of a conventional picking lug.

A third selective fumigation approach—one not employing the boxes of the present invention—may also be practiced. This approach, which is generically represented in FIG. 24, calls for selective fumigation in an "open-top" state using a conventional picking lug. As shown in FIG. 25, the picking lug contains multiple vents on three of its five structured sides. Like the inventive boxes described above, it also contains recessed edges on opposing sidewalls. The picking lug is composed of durable polyethylene material. Currently, the picking lug is classified by the U.S. Department of Agriculture as an acceptable fumigation container.

Up to the automated volume fillers of the packing house, the open-top selective fumigation approach using picking lugs is identical to the first approach described above. However, at the packing area the processes begin to diverge. To begin with, a picking lug, rather than a box, is placed atop the automated volume filler. As each picking lug becomes sufficiently loaded with fruit, it is withdrawn and used to form a picking-lug pallet. Because the picking lug normally is of greater volume than either a conventional shipping box or the inventive boxes of the present invention, there are fewer members per pallet.

The picking-lug pallets are transported to the fumigation chamber 40 of the fumigation facility 32 (see FIG. 12). After the fumigation process and subsequent off-gassing are completed, the picking-lug pallets are sent to packing area 44. Here, the pallets are broken down and a plastic bag is placed over the top of each picking lug. A conventional shipping box is then placed over the plastic bag, and the entire combination is inverted. The fruit is now disposed within the shipping box and the picking lug is removed and recycled for further use.

The conventional shipping boxes travel along conveyor 42 past the inspection area 46 and box taper 48. Along the way, the cover to the shipping box is placed over the lower portion of the box containing the fruit, and identifying tape is applied to the upper surface of the box cover. The boxes then continue along conveyor 42 to palletizing area 50, where the boxes are re-palletized. The loaded pallets are taken to pallet netting area 52 for the application of netting to ensure pallet integrity during subsequent shipment. The pallets are then transported out of fumigation facility 32 either to the cold storage area of the packing house or directly to shipment vehicles.

While open-top selective fumigation using picking lugs (the so-called third approach) does not possess each and every one of the advantages of the two above-described approaches, it is nevertheless a significant advance over existing procedures. Even though the packing requirements within fumigation facility 32 are more extensive than with the first two approaches, the process still results in significantly fewer workers being exposed to fumigated fruit. Further, because less fruit is actually fumigated, adverse environmental imapcts caused by venting methyl bromide gas to the atmosphere are drastically reduced.

Figure 26:
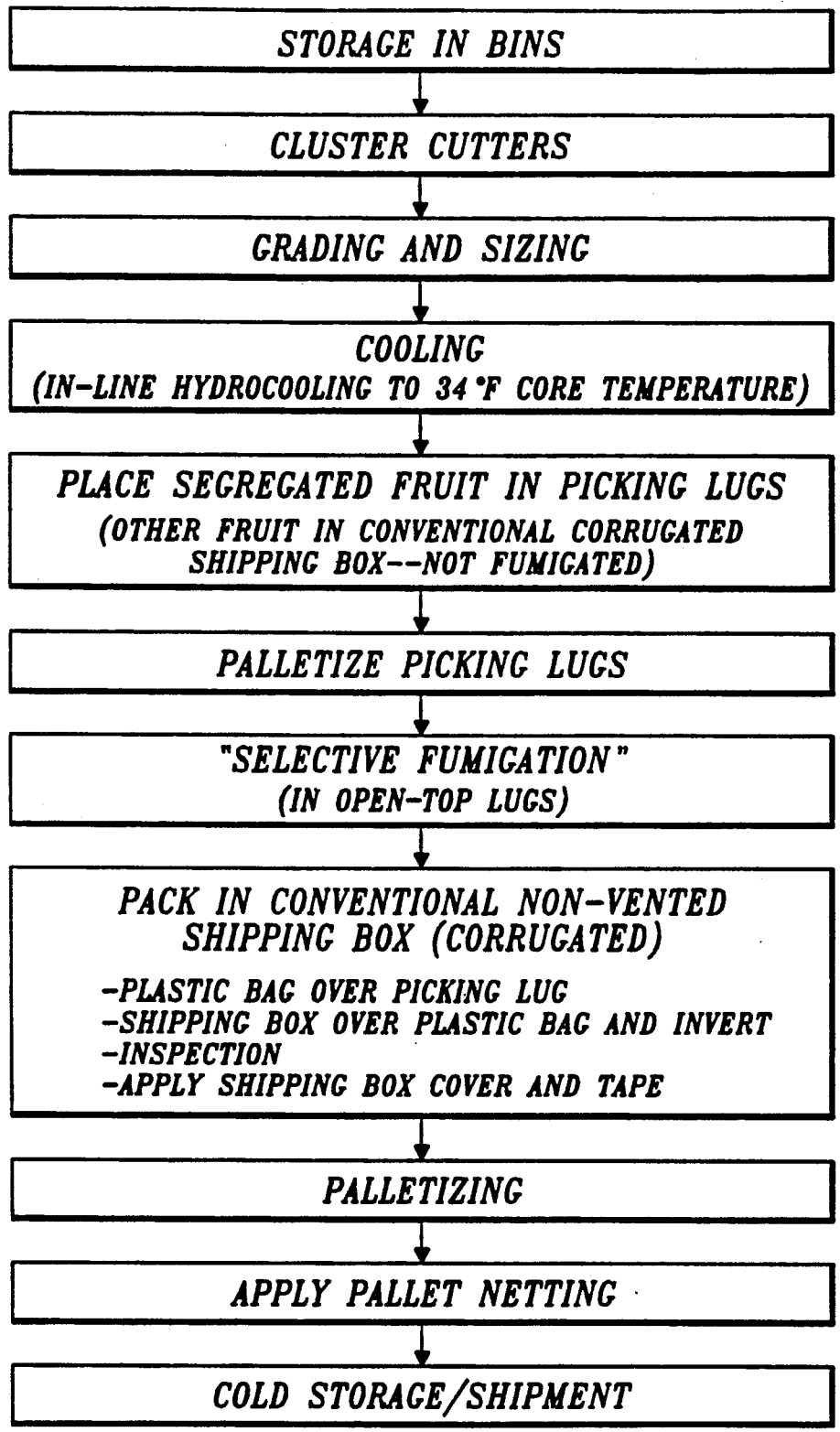
FIG. 26 is a more detailed flowchart showing the generic process of FIG. 24 applied to cherries.

The process for selectively fumigating in an open-top state using picking lugs, as applied to cherries, is represented in FIG. 26. As would be expected, this process contains each of the above-described steps that are specific to the treatment of cherries, only applied under the generic third approach. Finally, it should be noted that because apples and the like must be place-packed in shipping boxes, this third generic approach is not applicable to such fruit.

While preferred embodiments of the present invention have been illustrated and described, it should be understood that variations could be made therein without departing from the scope of the invention. For instance, the invention is applicable to the fumigation of a wide variety of food commodities (e.g., produce) and need not be restricted solely to fruit fumigation, much less to the specific fruits discussed above. In fact, the invention is particularly applicable to the fumigation of citrus. Further, the invention need not be restricted to domestically grown food commodities.

Accordingly, it is to be understood that the invention is not to be limited to the specific embodiments illustrated and described. Rather, the true scope of the invention is to be determined by reference to the following claims.

The embodiments of the invention in which an exclusive property or privilege is claimed are defined as follows:

1. A method for selectively treating a produce commodity, the method comprising the steps of:
   (a) grading and sizing the commodity to segregate that fraction of the produce commodity to be fumigated;
   (b) packing the segregated commodity for fumigation and subsequent shipment by first placing the segregated commodity in the bottom component of a vented fumigation container and then placing the top component of the fumigation container over the bottom component to form a closed container, wherein both the bottom and top components are of solid-wall construction and are composed of wood fiber substantially free of contaminants that would bind fumigant gas, such that the container is resistant to the entrapment of fumigant gas;

(c) fumigating the fumigation container and the commodity contained therein in the closed-container state by passing thereover a fumigant gas from an external source, wherein the step of fumigating comprises:
  (i) stacking a plurality of said closed containers containing said produce commodity within a fumigation chamber having first and second ends and a fumigant blower positioned at the first end of the chamber, the fumigant blower having an inlet and an outlet disposed at a location spaced from the inlet;
  (ii) circulating the fumigant gas from the blower outlet to the blower inlet, such that the fumigant gas circulates from the first end of the fumigant chamber to the second end of the fumigant chamber and back, being forced to flow into and through the stacked vented containers therebetween, to expose the commodity within the closed container to the fumigant gas;
  (iii) exhausting the fumigant gas from the fumigation chamber and from the containers; and
  (iv) removing the containers from the fumigation chamber prior to shipment of the packed, fumigated commodity and containers; and then (d) shipping the fumigated commodity in said closed, vented fumigation containers.

2. The method of claim 1, wherein one of the components of the fumigation container contains vents and the other component contains aligned screened vents.

3. The method of claim 1, wherein the commodity is fruit.

4. The method of claim 1, wherein inner and outer sides of the bottom and top components are coated with a water impervious layer.

5. A method for treating a produce commodity with fumigant gas, the method comprising the steps of:
  (a) packing the produce commodity for fumigation and subsequent shipment by first placing the commodity in an open-topped bottom component of a vented fumigation container, wherein the bottom component of the vented fumigation container is of solid-wall construction and is composed of wood fiber substantially free of contaminants that would bind fumigant gas such that the container is resistant to the entrapment of fumigant gas; and
  (b) fumigating the bottom component of the fumigation container and the commodity contained therein by passing thereover a fumigant gas from an external source, wherein the step of fumigating comprises:
    (i) stacking a plurality of said bottom components of said fumigation containers containing the produce commodity within a fumigation chamber having first and second ends and a fumigant blower positioned at the first end of the chamber, the fumigant blower having an inlet and an outlet disposed at a location spaced from the inlet;
    (ii) circulating the fumigant gas from the blower outlet to the blower inlet, such that the fumigant gas circulates from the first end of the fumigant chamber to the second end of the fumigant chamber and back, being forced to flow into and through the stacked bottom components of the vented containers therebetween, to expose the commodity within the bottom components to the fumigating gas;
    (iii) exhausting the fumigant gas from the fumigation chamber and from the bottom components; and
    (iv) removing the bottom components from the fumigation chamber prior to shipment of the packed, fumigated commodity and containers and then closing the open tops of the bottom components to form closed containers; and thereafter (c) shipping the fumigated commodity in said closed fumigation containers.

6. The method of claim 5, wherein the step of closing the open top of the bottom component of the fumigation container comprises placing a top component of the container over the bottom component of the container.

7. The method of claim 5, wherein the closed vented container is constructed to prevent reinfestation of the commodity after fumigation.

8. The method of claim 5, further comprising the step of grading and sizing the commodity to segregate a fraction of the commodity to be fumigated followed by packing the segregated produce commodity for fumigation and subsequent shipment in the bottom component of the fumigation container.

9. A method for selectively treating a produce commodity, the method comprising the steps of:
  (a) grading and sizing the commodity to segregate that fraction of the produce commodity to be fumigated;
  (b) packing the segregated commodity for fumigation and subsequent shipment by first placing the segregated commodity in a vented fumigation container and closing said container to form a closed container, wherein said closed container is of solid-wall construction and is composed of wood fiber substantially free of contaminants that would bind fumigant gas, such that the container is resistant to the entrapment of fumigant gas;
  (c) fumigating the fumigation container and the commodity contained therein in the closed-container state by passing thereover a fumigant gas from an external source, wherein the step of fumigating comprises:
    (i) stacking a plurality of said closed containers containing said produce commodity within a fumigation chamber having first and second ends and a fumigant blower positioned at the first end of the chamber, the fumigant blower having an inlet and an outlet disposed at a location spaced from the inlet;
    (ii) circulating the fumigant gas from the blower outlet to the blower inlet, such that the fumigant gas circulates from the first end of the fumigant chamber to the second end of the fumigant chamber and back, being forced to flow into and through the stacked vented containers therebetween, to expose the commodity within the closed container to the fumigant gas;
    (iii) exhausting the fumigant gas from the fumigation chamber and from the containers; and
    (iv) removing the containers from the fumigation chamber prior to shipment of the packed, fumigated commodity and containers; and then
  (d) shipping the fumigated commodity in said closed, vented fumigation containers.

* * * * *